Jan. 13, 1942.   B. v. BORRIES ET AL   2,270,112
ELECTRON OPTICAL DEVICE
Filed Jan. 28, 1939
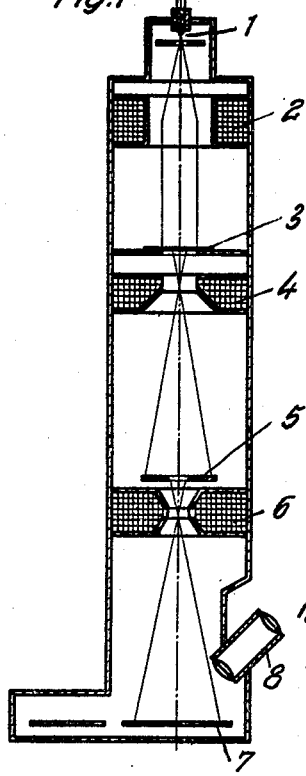
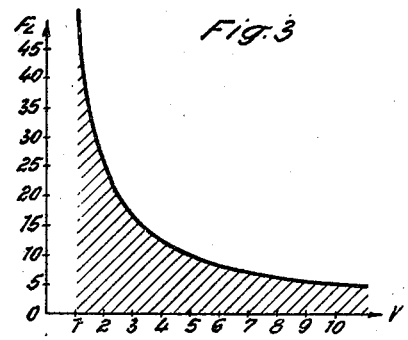
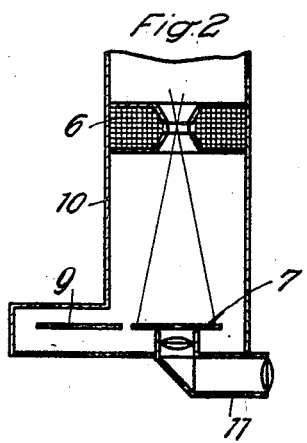
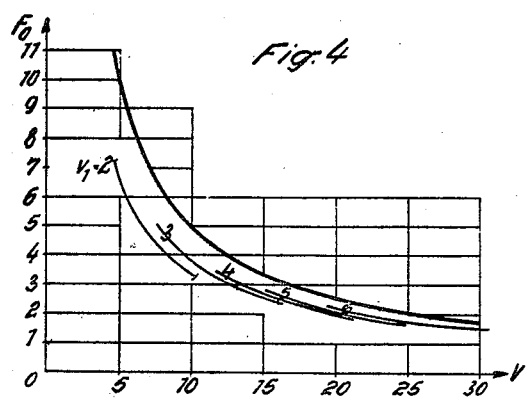
Inventors
Bodo v. Borries and
Heinz Otto Müller
by Knight Bros
Attorneys Patented Jan. 13, 1942

2,270,112

UNITED STATES PATENT OFFICE 2,270,112

ELECTRON OPTICAL DEVICE

Bodo v. Borries, Berlin-Spandau, and Heinz Otto Müller, Berlin-Pankow, Germany, assignors to "Fides Gesellschaft für die Verwaltung und Verwertung von gewerblichen Schutzrechten mit beschränkter Haftung," Berlin, Germany, a corporation of Germany Application January 28, 1939, Serial No. 253,274
In Germany January 28, 1938

3 Claims. (Cl. 250—49.5)

The present invention relates to electronic microscopes and more particularly to means for obtaining a magnified projection of objects by a combined electron-optical and light-optical method.

It has been proposed to combine an electron-microscope with a light-microscope in such a manner that the image produced by the electron-optical means on a projection screen is magnified to a further extent with the aid of the light microscope and projected onto a photographic layer, by means of which the image is fixed. It has been found that in such an arrangement the magnifying factor, theoretically obtainable, cannot be utilized, because with increasing magnification the energy concentrated in the object for re-radiation soon attains such a high value that the object is damaged within a short time to the extent of rendering its projection worthless. A reduction of the energy in the object and a corresponding increase of the exposure time without the use of a light microscope is in this case possible the same as when taking pictures by usual photographic methods, but the image cannot be precisely focused so that a number of differently focussed pictures must be taken in order to subsequently select the image having the greatest sharpness.

It is an object of the present invention to eliminate the above-mentioned difficulties. Another and more particular object is to produce images of great magnification while permitting a focusing before the image is fixed on a photographic layer.

To this end, according to the invention, the magnifying arrangement is designed to result in a relationship between the permissible energy in the object and the magnifying factor of the electron microscope of such magnitude that the image produced on a screen capable of being replaced by a photographic layer, presents sufficient brightness for focussing the maximum sharpness with the aid of the eye. The focussing of this image is effected by the use of a magnifying device such as magnifying lens on a light microscope having preferably a magnifying factor lying between 5 and 30, which operates without considerable light losses and is arranged in the electronic microscope or secured thereto. The image thus focussed to the greatest sharpness may be fixed after replacing the screen by a photographic layer, and the image produced may be magnified to a further extent, if desired, by the light-optical method up to the limit of the resolving power of the photographic layer.

The invention is illustrated in the accompanying drawing, in which—

Figs. 1 and 2 represent in longitudinal section two modifications of an electron microscope, and
Figs. 3 and 4 represent two graphs which are to be explained later.

In Fig. 1, 1 denotes the electron source of the electron microscope. 2 is a condenser coil. The electron rays condensed by this coil fall on the object 3. The object is projected with the aid of the objective coil 4 onto an intermediate projection screen 5 and then onto the projection screen 7 of the electron microscope with the aid of a projection coil 6 lying behind the coil 4 relative to the path of rays. 8 denotes the optical system (magnifying lens or light microscope) serving to focus the image. The projection screen 7 may be displaced transversely to the direction of the path of rays by means not shown and may be replaced by a carrier for a photographic layer consisting of a photographic plate 9. 10 denotes the vacuum vessel enclosing the electron microscope. In this embodiment the image on the screen is viewed from the side on which the electrons strike the screen.

Fig. 2 is a modification of the arrangement of Fig. 1, only the modified lower part of the microscope being shown. 6 denotes the projection coil, 7 the screen, 9 the photographic plate and 10 the vacuum tight wall. The light-optical device 11 serving to focus the image is so arranged that the rays passing through the screen 7 strike the eye of the observer.

It has been found that when using fine-grained projection screens of great sensitiveness, such as are being used in telescopes, a current density of the corpuscular ray of about $10^{-11}$ amp./cm.$^2$ is sufficient in the case of a ray voltage of 70,000 volts in order to produce a picture of such an intense brightness that all minute details can be recognized by the eye. If these minute details cannot be detected by the eye they are made evident according to the invention by the use of light-optical means. As above described the image thus focussed is fixed by means of a photographic layer. The resolving power of the human eye amounts to $\frac{1}{10}$ mm., whereas the resolving power of suitable photographic plates amounts to $\frac{1}{100}$ mm. The images thus fixed may be subsequently optically magnified ten times the normal size (or also for a better observation twenty to thirty times the normal size). The energy taken up by the object amounts then in the case of an equal final magnification only to one hundredth of that which must be taken up if the entire magnification would be effected by the electron-optical method. This becomes evident if it is considered that the energy of the rays passing through the object decreases with the square of the magnification and that the energy must be so great on the screen that focussing may be effected with the aid of the eye in all cases where the eye must adapt itself to great contrasts between light and dark. As above described the magnifying means which are employed according to the invention for focussing the electron-optical image should only have the smallest possible light losses so that the intensity of illumination on the retina of the eye does not become considerably smaller despite the use of the magnifying lens or the microscope.

The conditions will be apparent from the following:

$B_0$ denotes the light density of the surface radiating according to a Lambert distribution in the direction of the surface normal ($sb$).

$E$ is the intensity of illumination on the retina of the eye ($lx$) which is considered as having no losses; the intensity is more particularly $E_0$ in the case of a naked eye,
$E_L$ when using a magnifying lens,
$E_M$ when using a microscope.

$p$ denotes the diameter of the pupil of the eye (cm), $f_a$ the focal length of the eye (cm.);

$K$ the transparency of the magnifying lens, $K_1$ the transparency of the microscope objective, $K_2$ the transparency of the ocular of the microscope, $S$ the clear visual distance (cm.) $S=25$ cm., $A_0$ the eye aperture at the side of the object $=p/S=1/50=0.02$, $A_B$ the eye aperture at the side of the image $=p/f_a$, $v$ the total magnification, $v_1$ the magnification by the objective of the microscope, $v_2$ the magnification by the ocular of the microscope, $1/F_L$ the intensity of light of the magnifying lens, and $1/F_0$ the intensity of light of the objective of the microscope.

The intensities of illumination on the retina of the eye may be attained by the following equations in which the letters have the meaning given above:

$$E_0 = \frac{\pi}{16} \cdot 10^4 \cdot B_0 \cdot A_B^2 \cdot \frac{1}{1+\left(\frac{A_0}{2}\right)^2} (lx) \quad (1)$$

$$E_L = \frac{\pi}{16} \cdot 10^4 B_0 \cdot A_B^2 K \frac{1}{1+\left(\frac{A_0}{2}\right)^2 v^2}$$

$$= E_0 \cdot K \cdot \frac{1}{1+\left(\frac{v}{100}\right)^2} (lx) \quad (2)$$

$$E_M = \frac{\pi}{16} \cdot 10^4 B_0 \cdot A_B^2 K_1 K_2 \frac{1}{1+\left(\frac{A_0}{2}\right)^2 \cdot v^2}$$

$$= E_0 \cdot K_1 K_2 \cdot \frac{1}{1+\left(\frac{v}{100}\right)^2} (lx) \quad (3)$$

If the luminous surface is viewed at the angle $\alpha$ to the surface normal, the intensities of illumination on the retina of the eye decrease approximately to the amount $E \cdot \cos \alpha$.

As will be apparent from the Equations 1, 2, and 3 the intensity of illumination when using the magnifying lens or the microscope, diminishes on the one hand by the losses of absorption of the optical system with respect to that when observing with the naked eye, and on the other hand by a certain factor which is slightly different from unity and which becomes essential only in the case of greater optical magnifications. However, since magnifications above 30 have no value this factor is always greater than 0.9. Also the absorption losses of the optical instruments are never so great as to impair the above-mentioned advantage of charging the object hundred times less than has hitherto been necessary.

The Equations 1, 2, and 3, however, hold good only under the condition that the aperture of the magnifying lens or of the light-microscope is increased with respect to the aperture of the eye in proportion to the optical magnification brought about by the optical system. In the case of a microscope another condition must be fulfilled, i. e., the condition that also the entire flux of light taken up by the objective must pass into the pupil of the eye. The mathematic form into which these conditions may be brought is given by the two equations $$\frac{1/F_L}{p/S} > v \text{ when using a magnifying lens} \quad (4)$$

$$\frac{1/F_0}{p/S} > v > \frac{1/F_0}{p/S} \cdot \frac{v_1}{1+v_1} \text{ when using a microscope} \quad (5)$$

If $p/S=0.02$, the curve shown in Fig. 3 is obtained for the apertures necessary for the magnifying lens in accordance with the magnification. $F_L$ must always be smaller than the value resulting from the curve. The magnitude of $F_0$ for the objective of the microscope may be obtained from the diagram of Fig. 4. Here $F_0$ must always be smaller than the heavy line curve and greater than the light line curve which holds good for the chosen magnification $v_1$ of the objective.

When viewing the image projected on the screen from the same side from which the electrons fall onto the screen, the optical system must be inclined to the axis of the image produced by the electron rays. It is preferable to incline the optical system only to a slight extent in order to reduce the unavoidable optical distortions. In this case, however, the difficulty is presented that electrons must pass by the objective of the microscope and must illuminate a sufficiently large field of view. This condition may be easier fulfilled in the case of objectives having a greater focal length and therefore a greater distance between the object and the objective than in the case of the usual objectives for microscopes. Since owing to the brightness of the image large apertures are at the same time necessary, photographic objectives of a large aperture and moderate focal length are employed, for instance, an objective having an aperture 1:1.5 and a focal length of 36 mm. In this case the ocular and objective of the microscope or the magnifying lens are preferably so constructed—in view of as great a transparency as possible—as to contain only a few surfaces air-glass and vacuum-glass; this is permissible, since the requirements as to the sharpness of the image are not of such an exacting character in the case of the slight magnification required. In this case one of the lenses may form a part of the vacuum wall in order to dispense with two further surfaces air-glass. To protect the eye against X-rays one of the lenses may be made of lead glass and used instead of the usual screen of lead glass.

To focus the image it is essential that a fluorescent substance should be employed which on the one hand is highly sensitive and on the other hand has at least the same resolving power as the photographic plate. Furthermore, care should be taken that either the photographic layer lies exactly in the same plane in which the projection screen is viewed or to effect after the removal of the projection screen a known correction of the focal length, for instance, of the projection lens.

As photographic material that layer is best in which the product of the square of the density of charge in Coulombs/cm.$^2$ necessary to attain a certain blackening, and of the linear resolving power in cm., is a minimum.

What is claimed is:

1. Electron-optical device for producing magnified images of objects, comprising in combination a vertical vacuum vessel, irradiating means disposed in the upper portion of said vessel for producing a substantially vertical electron beam, means in said vessel for accommodating an object to be examined in the path of said beam, an electron-optical lens system for producing a magnified image of the object, a luminous screen and a carrier for a photographic layer, said carrier and said screen being movable relatively to each other and arranged at the bottom of said vessel, means for displacing said carrier and said screen for placing them in the same optical plane and in the same position relative to said beam, and a light-optical microscope arranged on said vacuum vessel between said lens system and said screen and carrier to allow observing the image on said screen from the side of incidence of said beam for focusing said image before photographically fixing it by means of said carrier.

2. Electron-optical device for producing magnified images of objects, comprising in combination a vertical vacuum vessel, irradiating means disposed in the upper portion of said vessel for producing a substantially vertical electron beam, means in said vessel for accommodating an object to be examined in the path of said beam, an electron-optical lens system for producing a magnified image of the object, a luminous screen and a carrier for a photographic layer, said carrier and said screen being movable relatively to each other and arranged at the bottom of said vessel, means for displacing said carrier and said screen for placing them in the same optical plane and in the same position relative to said beam, and a light-optical microscope arranged on said vacuum vessel between said lens system and said screen and carrier to allow observing the image on said screen from the side of incidence of said beam for focusing said image before photographically fixing it by means of said carrier, said light-optical microscope having its optical axis inclined relative to the axis of said electron-optical lens system so that both axes intersect each other in said optical plane of said screen.

3. Electron-optical device for producing magnified images of objects, comprising in combination a vacuum vessel, irradiating means disposed in said vessel for producing an electron beam, holding means in said vessel for accommodating an object in the path of said beam, an electron-optical lens system for producing a magnified image of the object, a luminous screen and a carrier for a photographic layer, said carrier and said screen being movable relatively to each other and arranged at the bottom of said vessel, means for displacing said carrier and said screen for placing them in the same optical plane and in the same position relative to said beam, and a light-optical microscope arranged on said vacuum vessel between said lens system and said screen and carrier to allow observing the image on said screen from the side of incidence of said beam for focusing said image before photographically fixing it by means of said carrier, said electron-optical system having a magnification factor corresponding to a magnification, of the smallest image details intended to be visualized, above the lower limit of the resolving power of the photographic layer yet below the lower limit of the resolving power of the human eye, and said light-optical means having a magnifying factor in the order of magnitude of the ratio between the resolving power of the human eye and that of the photographic layer and an effective aperture larger, in approximate proportion to said latter magnifying factor, than the average aperture of the human eye.

BODO v. BORRIES.
HEINZ OTTO MÜLLER.